March 2, 1943.　　W. C. TEUNISZ　　2,312,682
CREAM SEPARATOR
Filed Dec. 1, 1939
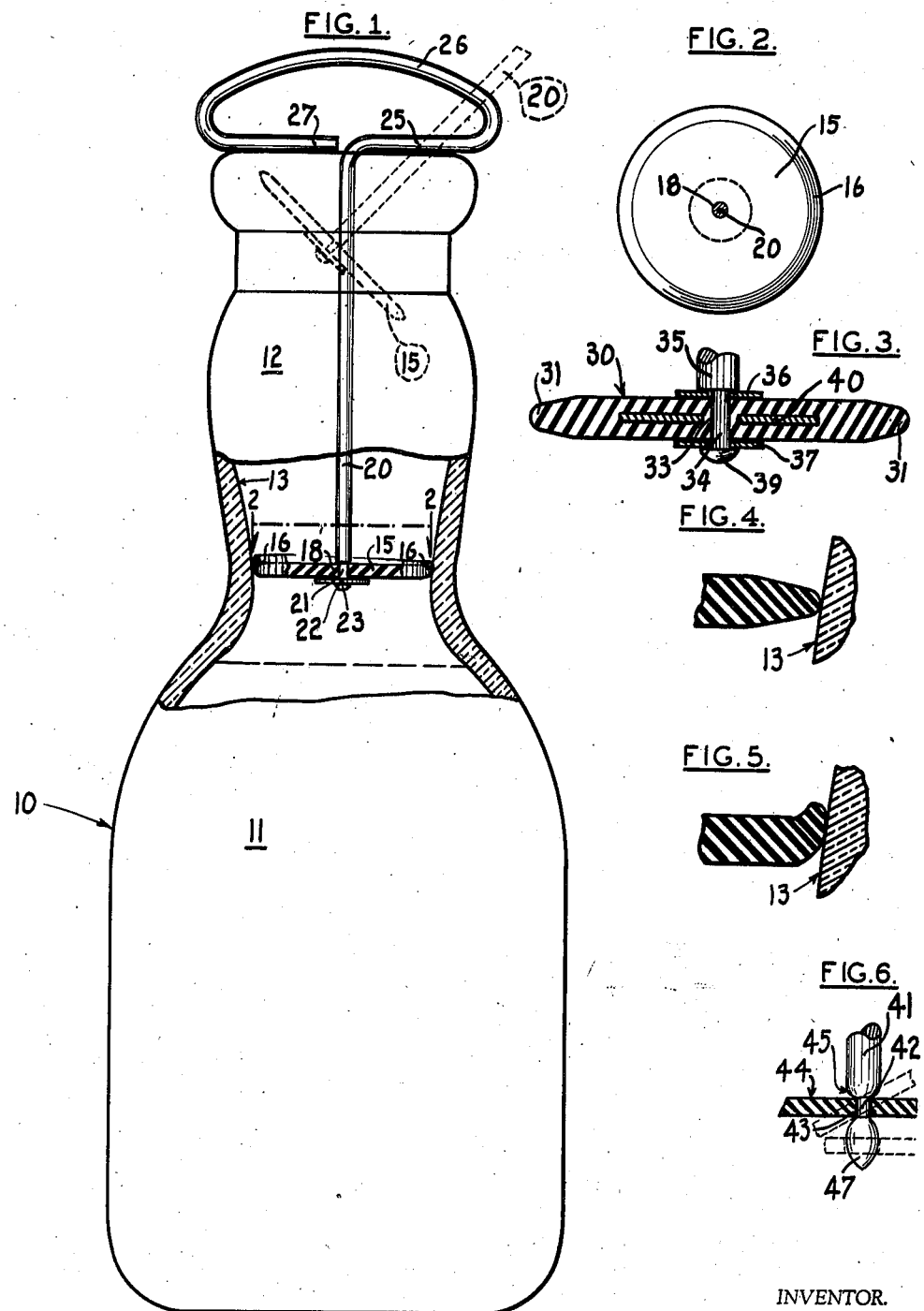
INVENTOR.
WILLIAM C. TEUNISZ.
BY Thomas G. Boman
ATTORNEY.

Patented Mar. 2, 1943

2,312,682

UNITED STATES PATENT OFFICE 2,312,682

CREAM SEPARATOR

William C. Teunisz, Grand Rapids, Mich.

Application December 1, 1939, Serial No. 307,138

4 Claims. (Cl. 210—51.5)

My invention relates generally to a bottle partition and more particularly to a cream separator.

As is shown in the patent to Chambers, #1,421,909; dated July 4, 1922, it is old to utilize a flexible separating disc whereby entry of the same may be made through a somewhat restricted opening. However, in the Chamber's construction, the bowing will occur in the same disc diameter due to the non-symmetrical center disc support and it is one object of my invention to symmetrically form the central disc support whereby the disc will irregularly be distorted, when necessary, about many radial and nonradial lines thus preventing permanent bowing thereof in any single plane. Thus the article is long lived and efficient throughout its life.

Yet another advantage resides in my novel compressible edge construction whereby the plane of the disc may be horizontally located even though the size of the throat of the bottle be varied considerably. In other words, the edge compression may be more or less while the central body of the disc is properly positioned in a horizontal plane. Thus a tight seal is had completely around the disc.

Also, I provide means for locating the feather edged disc at a certain distance below the mouth of the bottle whereby the amount of friction between the disc and the bottle is sufficient to hold the separator in place during the operation of pouring the cream or the like from the bottle.

And, it will be understood that I may provide different lengths of stems for the discs whereby the cream chamber is altered in size. Of course, in case of a rather great change of cream contents, it is best to utilize a disc of slightly different size, but since the throat of the bottle has only a slight taper, the same disc may be used in many instances.

It will be understood that the insertion of my separator disc into the bottle bends the edge of the disc upwardly during the insertion and it remains so whereby it forms an angular fit against the bottle thus preventing accidental slipping thereof. In other words, the edge trails the discs proper and thus locks the disc in place.

Another advantage of my invention lies in the detachable connection between the disc and its stem. Thus cleanliness is assured.

Also, the disc is movably mounted relative to its stem thus permitting movement of the stem without corresponding movement of the disc.

Other advantages and features and meritorious qualities will become apparent as the description proceeds.

In the drawing:

Fig. 1 is a side view of a milk bottle, of the two-chamber type, showing my separator in place therein. Parts are broken away in order to expedite the showing. The dotted lines indicate one position of the separator during its insertion.

Fig. 2 is a sectional view taken along the line 2—2 of Fig. 1.

Fig. 3 is a sectional view taken through the disc of a modified form of my separator.

Fig. 4 is a fragmentary sectional view showing the initial engagement between the disc and the bottle throat.

Fig. 5 is also a fragmentary sectional view showing the terminal or final engagement between the disc and the bottle throat.

Fig. 6 is a sectional view showing the detachable and universal connection which may be used between the disc and the stem.

Similar numerals refer to similar parts throughout the several views.

As shown in Fig. 1, numeral 10 indicates a milk bottle generally, the lower part 11 being the milk chamber and the upper part 12 being the cream chamber.

The medial part of the bottle is constricted as shown and an inner surface 13 is of annular shape, extending completely around the bottle. This surface of frustum conical shape provides for the seating of the disc thereagainst.

The disc 15, see Figs. 1 and 2, is of circular shape and has a thinned or narrowed edge formed of rubber which rubber has the characteristic of being easily compressible. The central portion of the disc 15 may also be formed of rubber having either the same easily compressible feature or else less compressible. However, the extra thickness of the medial portions, together with the reinforcing washer, provide extra strength for the central part of the construction. The thinned edge of the disc 15 is designated by numeral 16, and the showing of Fig. 1 clearly shows the wedging and locking of the edge occurring completely around the periphery of the disc. Figs. 4 and 5 are enlarged views illustrating this same novel locking function whereby accidental dislocation of the disc 15 is prevented.

The disc 15 may be formed completely of rubber, or else equivalent materials may be used. Plastics, having the required characteristic, may be used.

The disc 15 has an opening 18, preferably centrally located, therein. A stem 20 has a reduced portion 21 at its lower end extending through the opening 18 and a washer 22 and is headed or riveted over at 23 whereby the parts are held in assembled position. The disc is held snugly between the washer 22 and the shoulder formed on the stem 20 although the stem may be turned when desired, relative to the disc 15.

The stem 20 extends upwardly as shown to the top of the bottle and is then formed laterally at 25, then over and around at 26, and then terminated in an inwardly extending part 27. Thus a more or less closed loop is formed and the fingers or hand of the user may be received therein. The parts 25 and 27, or at least one of them, are adapted to contact the bottle upon downward insertion of the separator whereby the separator is exactly positioned in its variably dimensioned seat surface thus given a seal which is not too tight and which is not too loose. If the seal were to be too loose then the disc, as the cream was being poured from the bottle, might become loosened and fall out permitting the milk to flow out with the cream. If the seal were to be too tight, then the entry as well as the removal of the disc is unduly difficult. And, additionally, the central part of the disc is bodily distorted under these extreme pressure conditions whereby the flexible edge may not give an even seal.

However, the downward movement of the disc 15 is halted at the proper place whereupon the edge of the disc is compressed to or remains at the proper state of compression to give a perfect seal yet permit easy insertion and withdrawal of the separator.

The dotted line showing of Fig. 1 shows one position of the disc 15 during its entry into the bottle whereby an easy entry is had. Also, there is no substantial agitation of the cream during this entry movement.

Fig. 3 shows a modified form or type of disc 30 having a reduced edge 31. The edge 31 may assume the shape and position as shown in Fig. 4 during its entry and that as shown in Fig. 5 after it occupies its fully seated position. The disc 30 has a central hole 33 which receives the reduced portion 34 of the stem or supporting rod 35 and a washer 36 is located at the top of the disc and a second washer 37 is located below the disc. The smaller portion 34 is beaded over at 39 to hold the several parts in place. If desired, a reinforcing plate 40 may be embedded within the disc 30. The reinforcing plate is relatively small in diameter whereby its presence does not interfere with the insertion of my separator into a bottle of the type shown in Fig. 7.

As is shown in Fig. 6, the stem 41 is reduced at 42 to receive hole 43 of the disc 44. The shoulder between the sections of the stem is rounded as at 45 whereby pivotal movements of the disc 44 may be had. The part of the stem below the disc 44 is shaped as shown whereby the disc may be detached from the stem whenever desired. It is to be understood that the disc is formed of resilient and stretchable material whereby the normally circular hole 43 may be distorted over the oval shaped part 47 of the stem 41. Thus these parts may be separated and cleaned whenever desired by merely exerting pressure as indicated. And, the universal connection permits the disc to easily change its plane thus permitting an easily efficient seating action. The upper dotted line showing indicates the tilting of the disc and the lower dotted line showing indicates one position during the removal or application of the disc onto its stem.

It is to be understood that the disc may be made from many different kinds of materials so long as a proper seal may be had at the edges thereof and also a bodily dislocation permitted inwardly from the edges.

Having thus described my invention, I desire it to be understood that the invention is in no wise limited to the particular illustrative embodiments disclosed, the scope thereof being set forth in the following claims.

I claim:

1. A separator comprising a stem, a disc having a yieldable portion with an opening therethrough, the diameter of the opening being less than the diameter of the stem, said stem having one end tapered for forcible entry through the opening, and the said stem also having a groove adjacent the said tapered end whereby the disc may be held by resiliency therein.

2. A combination of elements as set forth in claim 1 in which the stem is cut away adjacent the groove to form rounded shoulders whereby the disc may tilt under certain conditions.

3. A separator for use in a milk bottle having a milk chamber and a cream chamber separated therefrom by a tapered cylindrical seat portion, said separator comprising a disc having a flexible edge and a stiffened central part, a stem of cylindrical shape, an annular groove in said stem near one end thereof, said groove having its sides flaring apart outwardly, said disc having an opening located in said groove whereby movement between the stem and the disc is permitted.

4. In combination with a bottle having a lateral surface and also having an interiorly tapered portion of appreciable length whereby a plurality of seats of gradually increasing diameter are formed, the diameters increasing in an upward direction, of a disc having a central portion and a flexible and compressible edge thereabout, said edge adapted to be forced against an intermediate one of the several seats to a sealing position, a stem attached to the disc, and rigid means attached to the stem and extending laterally therefrom, said means contacting the said lateral surface for the purpose described, and said means having a relatively wide lateral dimension whereby it cannot pass down into the top of the bottle and become effective when the disc is at the said intermediate seat whereby excessive bowing or wedging of the disc is prevented.

WILLIAM C. TEUNISZ.